May 6, 1930.  H. W. PLATENBERG  1,757,139
VALVE FOR OIL PUMPS
Filed Oct. 14, 1926
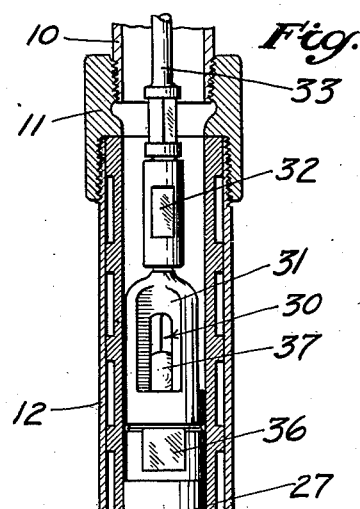
Fig. 1.
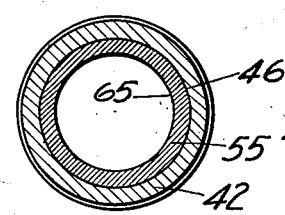
Fig. 3.
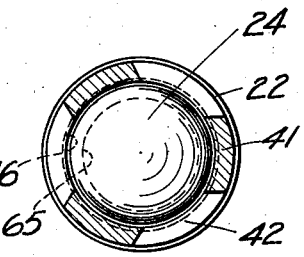
Fig. 4.
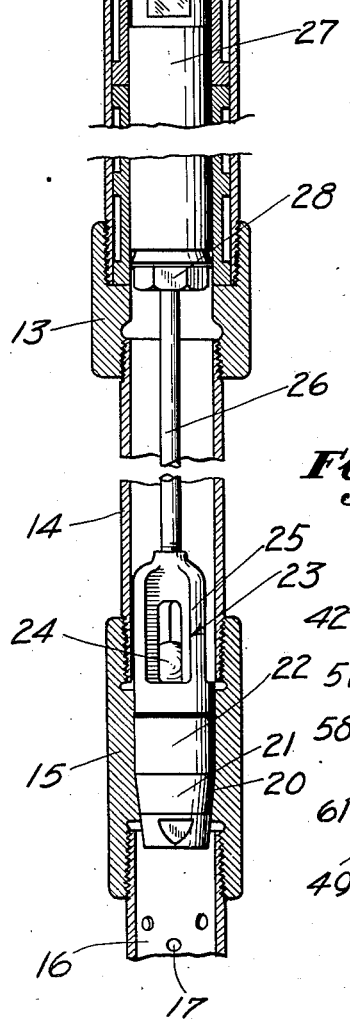
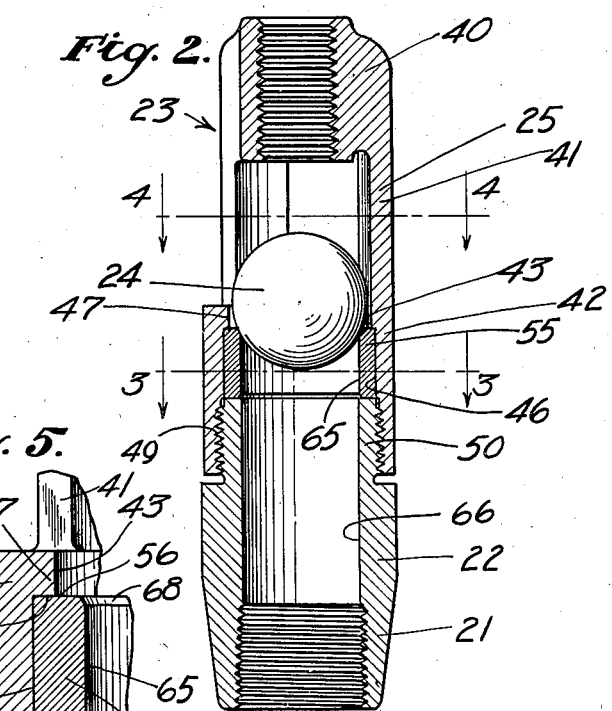
Fig. 2.
Fig. 5.
INVENTOR:
HERMAN W. PLATENBERG,
BY
ATTORNEY.

UNITED STATES PATENT OFFICE

HERMAN W. PLATENBERG, OF LOS ANGELES, CALIFORNIA, ASSIGNOR TO AXELSON MACHINE COMPANY, OF LOS ANGELES, CALIFORNIA, A CORPORATION OF CALIFORNIA

VALVE FOR OIL PUMPS

Application filed October 14, 1926. Serial No. 141,528.

My invention relates to an oil well pumping apparatus and more particularly to an improved ball valve for use in a reciprocating sucker rod pump.

The ordinary oil well pump consists of a barrel which is placed in the well near the bottom, being secured to the lower end of a pump tubing, and a plunger which is adapted to be reciprocated in the barrel by means of a string of sucker rods. The barrel is provided with a standing valve and the plunger is provided with a working valve. The standing and working valves in most common use comprise a seat rigidly secured in the valve body, a cage super-imposed above this seat, and a spherical steel ball enclosed in the cage and adapted to drop upon the seat when the valve is closed. It is obvious that the diameter of these valves is limited to the interior diameter of the pump barrel. This fact makes otherwise unimportant details of design of great importance in the utilization of the limited space within which these valves must operate.

One of the vital requirements of these valves is long life. Another is an opening of large cross-sectional area through which the oil may pass when the valve opens. In the past one of these objects has been obtained by a sacrifice of the other and the design of the ball valves now in common use in sucker rod pumps all represent a compromise in regard to the extent to which the above two highly desirable features are obtained.

It is common construction to provide the ball valve seat in the form of a separate annular ring which is disposed entirely within the oil passageway through the valve, thus lessening the size of the oil opening, this ring having a radial flange formed upon the exterior face thereof which is gripped between a shoulder of the valve cage and the upper end of the male threaded valve body which is threadedly received into the lower end of the cage collar. These valve seats have a relatively long life but they greatly restrict the size of the opening in the valve through which oil passes. Numerous attempts have been made to enlarge the opening through the valve seat to a greater diameter than three-quarters the diameter of the valve ball. These attempts have all previously been unsuccessful due to the hammer-like action of the valve ball upon the seat, especially in the working valve with the rapid change in direction of the plunger which causes the ball to be forcibly seated. The valve balls are formed necessarily of a very high carbon steel so that these balls will not wear out of true and cause the valve to leak. Thus when the valve seats are provided with openings larger than three-quarters the diameter of the ball, the force of the blows of the ball upon the seat have a large component which is directed in a radial direction tending to fracture the seat. Also, when the seats have such a large diameter the ball tends to wear the seats away in a short time so that the valve becomes leaky and requires that it be drawn to the surface for repair. In previous attempts to form these valve seats with a large diameter and of a hard material which would not thus wear away, the valve seats, being brittle, fractured after a short period of use and allowed oil to leak through the valve.

It is the broad object of this invention to provide a valve for a reciprocating pump having a valve seat in which the opening is of relatively larger diameter, which will have long wearing qualities and which will not fracture in a manner to cause the valve to leak.

Other objects and advantages will be made manifest in the following description and in the appended drawings in which—

Fig. 1 shows a vertical sectional view of a deep oil well pump barrel with a plunger and its associated standing valve disposed therein and shown in elevation.

Fig. 2 is a vertical sectional view of a ball valve of the pump illustrated in Fig. 1.

Figs. 3 and 4 are horizontal sectional views taken upon corresponding lines of Fig. 2.

Fig. 5 is an enlarged sectional view illustrating the improved valve of my invention.

Referring to the drawings by numerals, 10 indicates the lower end of a string of pump tubing which is screwed into an upper pump barrel collar 11. A pump barrel 12 is threadedly received at its upper end in the collar 11, and at its lower end into the collar 13. A connecting pipe 14 is secured at its upper end to the collar 13 and at its lower end to the standing valve seat collar 15. A strainer pipe 16 is threadedly received in the lower end of the collar 15, this pipe having perforations 17.

The collar 15 is provided with a standing valve body seat 20 with which a face 21 of the body 22 of a standing valve 23 is adapted to make fluid-tight contact. The valve 23 has a ball 24 enclosed within a cage 25. A garbutt rod 26 extends upwardly from the cage 25 into the lower end of a pump plunger 27, the garbutt rod 26 being provided with an enlarged upper end (not shown) which is adapted to be contacted by a nut 28 provided at the lower end of the plunger 27 when this plunger is withdrawn from the well, thus lifting the standing valve 23 to the top of the well with the plunger 27. At the upper end of the plunger 27 is a working valve 30. Secured to the upper end of a cage 31 of the valve 30 is a connector 32 which threadedly receives the lower end of a string of sucker rods 33 which extends upwardly from the bottom to the top of the well where it is provided with adequate reciprocating means (not shown).

The working valve 30 has a valve body member 36 and a spherical ball 37 which, with the cage 31, co-operate in the same manner as corresponding parts of the standing valve 23. A description of the standing valve as illustrated in detail in Figures 2 to 5 inclusive will also serve as a description of the working valve 30.

The valve cage 25 has a head portion 40 at its upper end, cage bars 41 extending downwardly therefrom and terminating at their lower ends in a collar 42. The cage collar is provided with a bore 43 which is substantially the same diameter as the space limited by the interior faces of the cage bars 41. This diameter is slightly greater than that of the ball 24. A counter-bore 46 is formed in the collar 42 so that an annular shoulder 47 is provided at the upper end of the collar 42. The lower portion of the counter bore 46 is threaded at 49 and is adapted to receive an upper male threaded projection 50 of the valve body 22.

The portion of the counter-bore 46 above the threads 49 is adapted to receive an annular valve seat member 55 so that an upper radial face 56 thereof is adapted to tightly contact a lower radial face 57 of the shoulder 47 formed at the upper end of the collar 42.

A cylindrical outer surface 58 of the valve seat member 55 is adapted to make a press fit with the cylindrical surface of the counter-bore 46. The projection 50 of the valve body 22 is then screwed upwardly into the threads 49 and an upper radial face 60 of this projection comes pressurally into contact with a lower radial face 61 of the valve seat member 55. The projection 50 is then advanced as far as possible into the threads 49 so that a constant and exceedingly high pressure is exerted downwardly upon the face 56, inwardly upon the face 58 and upwardly upon the face 61 of the valve seat member 55.

A bore 65 is formed within the valve seat member 55, this bore 65 being substantially of the same diameter as the bore 66 in the valve body 22 which is the maximum size of the opening through which oil is drawn through standing or working valves of the pump. The diameter of the bores 65 and 66 may vary between three-quarters and fifteen-sixteenths of the diameter of the ball 24, but it is most satisfactory when substantially seven-eighths of the diameter of the ball 24, as is illustrated in Fig. 2. The valve seat member 55 is provided with narrow valve seat faces 68 and 69 at the upper and lower ends of the bore 65 so that the valve seat member may be inverted after the upper valve seating face has been worn to present a fresh face to the action of the ball 24.

The valve seat member 55 is formed of a high carbon steel and is highly tempered so as to have long wearing qualities; the hardness of this metal, however, makes it very brittle and liable to fracture. Therefore, the collar 42 of the cage 25 is formed of a relatively soft steel permitting a press fit between the bore 46 and the outer surface 58 of the valve seat member 55. When the valve seat member 55 is thus pressed into the bore 46 and rigidly secured therein between the faces 57 and 60 any tendency of the hardened seat member 55 to fracture under the hammering action of the ball valve 24 is entirely overcome. It has been found in actual practice that the usual swedging of ordinary valve seats has been entirely eliminated in the improved valve of my invention. Moreover, due to the hardness of both the ball and the valve seat member, and due to the tight restriction imposed by the collar 42 and the projection 50 upon the exterior surfaces of the valve seat member 55, fracture of this valve seat member and the consequent impairment of the efficiency of the valve has been perfectly eliminated.

I claim as my invention:

1. In a deep well pump valve, the combination of: a member provided at its lower end with an annular collar of a relatively soft metal; a spherical ball adapted to be retained in said member, there being a central bore formed in said collar larger than the diameter of said ball, and a counter-bore formed in said collar to provide an inner, annular shoulder at its upper end, said counter-bore being threaded at its lower end; an annular seat member formed of a relatively hard, brittle metal, and having an upper radial face adapted to engage the lower face of said annular shoulder, an outer face adapted to fit the upper portion of said counter-bore, said collar exerting an inward pressure against said outer face, a lower radial face, and a central bore slightly smaller in diameter than said ball; and a male threaded member adapted to screw into the threads of said counter-bore and having a face which tightly engages the lower radial face of said seat member, thus placing said seat member in axial compression, and which has a bore in register with the bore of said seat member.

2. In a deep well pump valve, the combination of: a member provided at its lower end with an annular collar of a relatively soft metal; a spherical ball adapted to be retained in said member, there being a central bore formed in said collar larger than the diameter of said ball, and a counter-bore formed in said collar to provide an inner, annular shoulder at its upper end, said counter-bore being threaded at its lower end; an annular seat member formed of a relatively hard, brittle metal, and having an upper radial face adapted to engage the lower face of said annular shoulder, an outer face adapted to fit the upper portion of said counter-bore, said collar exerting an inward pressure against said outer face, a lower radial face, and a central bore between three-quarters and fifteen-sixteenths the diameter of said ball; and a male threaded member adapted to screw into the threads of said counter-bore and having a face which tightly engages the lower radial face of said seat member, thus placing said seat member in axial compression, and which has a bore in register with the bore of said seat member.

3. In a deep well pump valve, the combination of: a relatively soft primary member having a collar, said collar having a cylindrical opening, threads formed at one end of said cylindrical opening, and a substantially radial face at the opposite end of said cylindrical opening; a relatively hard and brittle seat member in said cylindrical opening, said seat member having substantially radial end faces, one of which engages said radial face of said collar, a cylindrical face press fitted to the wall of said cylindrical opening, said wall exerting a radial and inward pressure on said seat member; a secondary member engaging said threads, said secondary member having a substantially radial face adapted to engage one of said radial faces of said seat member, pressing thereagainst so as to place said seat member under axial compression; and a ball valve for engaging said seat member.

In testimony whereof, I have hereunto set my hand at Los Angeles, California, this 6th day of October, 1926.

HERMAN W. PLATENBERG.